3,434,994
OIL EXTENSION OF HIGH SOLIDS LATEX
Hendrik Smit, deceased, late of Sarnia, Ontario, Canada, by Lambton Trust Co. Limited, executor, Sarnia, Ontario, Canada, and Theodore Elmer Dunfield, deceased, late of Sarnia, Ontario, Canada, by Mauretia Mona Dunfield, administratrix, Sarnia, Ontario, Canada, assignors to Polymer Corporation Limited, Sarnia, Ontario, Canada, a body corporate and politic
No Drawing. Continuation-in-part of application Ser. No. 344,503, Feb. 12, 1964. This application Jan. 4, 1966, Ser. No. 518,736
Claims priority, application Canada, Feb. 19, 1963, 869,079
Int. Cl. C08d 7/02; C08c 11/32
U.S. Cl. 260—29.7          6 Claims

ABSTRACT OF THE DISCLOSURE

Up to 1,000 parts of unemulsified oil per 100 parts of polymer may be readily blended into aqueous emulsion polymerized latices of rubbery polymers of open-chain multiolefin monomers without the aid of emulsifiers or emulsifier forming compounds additional to the amounts of emulsifiers used in preparing the latices, if the latices are concentrated to at least 55% solids before the oil is added. The resulting latices are stable and do not exhibit oil separation.

---

This application is a continuation-in-part of the applicants' copending U.S. application Ser. No. 344,503, filed Feb. 12, 1964, now abandoned.

This invention relates to the extending of aqueous latices of rubbery polymers by the addition of oil thereto.

Use of oil in processing and compounding of rubbers has long been practised in the art. Furthermore use is made of the so-called oil masterbatches, wherein from 20 to 60 or more parts of petroleum extender oils are pre-emulsified in water and mixed with a rubber latex emulsion of 15 to 35% polymer solids, following which a coagulation and recovery of the polymer gives an oil-extended rubber. Such practice requires the prior preparation of the oil as an oil-in-water emulsion, so that when added to the aqueous latex, phase separation of the oil will not occur.

In the associated field of latex compounding technology, it is customary to use much less oil. Where employed, the amounts are usually 2 to 10 parts per 100 parts of polymer solids in the latex, and the oil is emulsified either in combination with other additives such as fillers, or is prepared as a separate oil-in-water emulsion to be added to the latex emulsion; the addition of un-emulsified oil has been considered to be undesirable without the concomitant addition of emulsifier to the system in addition to that already present in the latex as a result of its preparation. In latex compounding, the polymer solids in the latex may be in the 15 to 35% range but more often is in the 40 to 65% range.

It is an object of the present invention to provide a process whereby large quantities of unemulsified unadulterated oil may safely be added to an aqueous latex without encountering separation of the oil from the latex emulsion. Another object is to provide a stable and fluid high-oil-content aqueous latex.

It has now been found that an unexpectedly stable and fluid, high solids content, oil-extended aqueous latex may be obtained by a process comprising blending from 50–1000 parts of an unemulsified extender oil with an aqueous latex comprising a rubbery polymer of a polymerized $C_4$–$C_{12}$ multiolefinic hydrocarbon containing at least 55% by weight of a rubbery polymer and having a viscosity at 77° F. (25° C.) of at least two poises and preferably at least five poises said parts of oil being parts by weight per 100 parts by weight of said rubbery polymer said blending being carried out while maintaining said oil and said latex free of adulteration with a material selected from the group consisting of emulsifiers and compounds capable of being converted into emulsifiers on exposure to alkaline conditions, said material being additional to the emulsifier already present in the latex as a result of the preparation of said latex.

Preferably the rubber is a polymer of a diolefinic hydrocarbon, the latex contains at least 60% by weight rubbery polymer solids, the amount of oil added is within the range of 75 to 125 parts per 100 parts of rubbery polymer, and the latex has a viscosity at 77° F. of at least five poises. Generally the viscosity of a high-solids latex after concentration will have a viscosity of at least 2 poises, although preferably 5 to 25 poises, but most preferably a viscosity between 5 and 20 poises, and the content of rubbery polymer solids will be within the range of 60 to 70% by weight.

The extender oils which may be used in the process of this invention are preferably petroleum oils although vegetable oils may also be employed. Various methods for classifying petroleum oils have been devised. One method which is used quite frequently is based on the viscosity-gravity-constant (VGC) as defined in Equation 4, Analytical Chemistry, vol. 28, p. 1928 (1956) where $$VGC = \frac{G - 0.24 - 0.022 \log (V_2 - 35.5)}{0.755}$$

and where

G = specific gravity of the oil at 60/60° F.

$V_2$ = Saybolt Universal viscosity at 210° F.

Of the petroleum oils those having a VGC of 0.79–1.05 may be employed with those having a VGC of about 0.83–0.95 being preferred. This range of petroleum oils may be further described as follows.

| Type of oil: | Range of viscosity-gravity constant |
|---|---|
| Paraffinic | 0.79–0.82 |
| Relatively paraffinic | 0.82–0.85 |
| Naphthenic | 0.85–0.90 |
| Relatively naphthenic | 0.90–0.95 |
| Aromatic | 0.95–1.00 |
| Very aromatic | 1.00–1.05 |
| Extremely aromatic | 1.05 and above |

A number of suitable extender oils are listed in Table I under their trade designation along with some typical properties and analyses.

TABLE I.—SOME TYPICAL ANALYSES OF EXTENDER OILS

| | Circosol NS | Sundex 53 | Sundex 1585 | Shellflex 683 | Dutrex 1726 | Dutrex 757 | Califlux GP | Philrich 5 | Imperial Oil | |
|---|---|---|---|---|---|---|---|---|---|---|
| | | | | | | | | | QS-1178C | AC972 |
| Specific gravity, 60/60° F | 0.928 | 0.983 | 0.994 | 0.931 | 0.976 | 0.995 | 1.02 | 0.989 | 1.00 | 0.894 |
| Viscosity, S.S.U. at 210° F | 61 | 83 | 126 | 66 | 85 | 124 | 96 | 175 | 119 | 58 |
| Viscosity-gravity constant | 0.87 | 0.94 | 0.94 | 0.87 | 0.93 | 0.94 | | 0.93 | 0.95 | 0.83 |
| Structural analyses as to carbon type, wt. percent:[1] | | | | | | | | | | |
| C, aromatic | 18 | 37 | 41 | 21 | 38 | 44 | | | 41 | 10 |
| C, naphthenic | 39 | 29 | 22 | 29 | 22 | 13 | | | 26 | 26 |
| C, paraffinic | 43 | 34 | 37 | 50 | 40 | 43 | | | 33 | 64 |
| "Rostler," defined components, wt. percent:[2] | | | | | | | | | | |
| Nitrogen bases | 0.0 | 9.4 | 7.7 | | 11.0 | 14.4 | 18.7 | 11.0 | 20.2 | 2.2 |
| 1st acidaffins | 5.2 | 14.3 | 16.5 | | 19.5 | 21.6 | 15.5 | 19.0 | 14.1 | 4.2 |
| 2nd acidaffins | 35.6 | 52.8 | 56.3 | | 47.2 | 49.8 | 55.0 | 61.0 | 48.3 | 40.0 |
| Paraffins | 59.2 | 23.5 | 19.3 | | 22.3 | 14.2 | 10.8 | 9.0 | 17.4 | 53.6 |
| Asphaltenes | 0.0 | 0.0 | 0.0 | | 0.0 | 0.0 | 0.0 | 0.0 | 0.0 | 0.0 |
| ASTM, wt. percent:[3] | | | | | | | | | | |
| Asphaltenes | 0.0 | 0.0 | 0.0 | 0.0 | 0.0 | 0.0 | | | 0.0 | 0.0 |
| Polar aromatics | 2 | 6 | 12 | 4 | 16 | 10 | | | 16 | 4 |
| Saturates | 61 | 70 | 68 | 56 | 12 | 23 | | | 17 | 66 |
| Aromatics | 37 | 24 | 20 | 50 | 72 | 67 | | | 67 | 30 |

[1] S. S. Kurtz et al., "Hydrocarbon Composition & Viscosity-Gravity Constant of Rubber Processing Oils," IEC, Volume 48, page 2232 (1956).
[2] F. S. Rostler et al., "Compounding Rubber with Petroleum Products," IEC, Volume 41, pages 598–608 (1949).
[3] "Clay-gel Adsorption Chromatographic Method" (ASTM D-2007, Rev. 1962).

The rubbery polymers of this invention which may be extended by the process are formed from polymerizable multi-olefinic hydrocarbon monomers of which the $C_4$–$C_{12}$ multi-olefinic hydrocarbons are the most useful. In aqueous emulsion polymerization, the $C_4$–$C_6$ open chain multi-olefinc hydrocarbons are the preferred monomers; examples of these are butadiene-1,3, isoprene, 2,3-dimethylbutadiene, etc. In non-aqueous solution polymerization, the $C_{10}$–$C_{12}$ cyclic multi-olefinic hydrocarbons are the preferred monomers; examples of these are dicyclopentadiene and vinyl-dicyclopentadiene. Comonomers may be used as well where copolymers are desired. Such comonomers are generally hydrocarbons containing the vinylidene group, $H_2C=C<$ said group including the vinyl group, $H_2C=CH-$, examples of such comonomers being styrene, alpha-alkyl styrenes, β-vinyl naphthalene, ethylene, propylene, butylene, isobutylene, etc. Of the polymers prepared by aqueous emulsion polymerization, the butadiene-styrene copolymers are preferred in which the styrene content may vary from 0 to 60% by weight, and more preferably 0 to 35% by weight. Of the polymers prepared by non-aqueous solution polymerization, the ethylene-propylene terpolymers in which unsaturation has been introduced by a third monomer such as dicyclopentadiene and vinyl substituted dicyclopentadiene are preferred. When the ethylene content is between 30 to 80 mole percent, these polymers are rubbery.

The process of the invention may be applied to a latex of a rubbery polymer, or mixtures of such latices, or a mixture of a latex of a rubbery polymer with a latex of a resinous polymer such as polystyrene or a resinous copolymer of butadiene-styrene containing more than 70% styrene.

A latex most generally preferred in the invention is a latex which has a surface tension of less than 38, but greater than about 26, dynes per centimeter. It is also noted that where desired, a high solids natural rubber latex may be blended with an oil-extended latex of this invention.

The details of emulsion polymerization used to prepare the latices of the rubbery polymer, and where desired the resinous polymer, which may be used in this invention are known in the art. The steps in general consist of emulsifying in an aqueous medium a monomer, or group of monomers, initiating the reaction to convert monomer to polymer, and regulating the molecular weight of the polymer formed. The emulsifier may be one or more of the commonly used alkali metal soaps of the $C_{12}$–$C_{18}$ acyclic monocarboxylic acids, such as stearic, oleic, palmitic, lauric, etc., or alkali metal soaps of disproportioned rosin acids, or synthetic emulsifiers such as alkyl aryl sulphonates, polyoxyethylene glycol derivatives, and various mixed emulsifiers. The initiator may be any one of a wide variety of chemicals which react to give so-called free radicals, examples of such chemicals being potassium persulfate, alkali perborates, hydrogen peroxide, and organic peroxides such as cumene hydroperoxide. The regulating effect on molecular weight is obtained by use of a chain-transfer agent such as one of the $C_{10}$–$C_{16}$ mercaptans, e.g. n-dodecyl mercaptan, t-tetradecyl mercaptan, etc., which also acts in the role of a promoter in a polymerization reaction. When the desired conversion of monomer to polymer is achieved, an additional chemical is commonly added to inhibit or stop the reaction, such a chemical being for example hydroquinone, a dithiocarbamate, hydroxylamine hydrochloride, etc. The unreacted monomers are removed by such means as flash and steam distillations.

The details of obtaining a latex of a polymer which has been prepared by non-aqueous solution polymerization are also known in the field of polymer science. Examples of such systems are polymerization catalyzed by alkali metal salts, Friedel-Crafts catalysts, Alfin catalysts, and the more recent co-ordination complex catalysts commonly referred to as Zeigler catalysts. The polymers obtained in these systems are in solution in hydrocarbon compound solvents, for example the monomer itself or solvents such as methyl chloride, benzene, hexane, etc. Such solutions of polymers may be converted into latex form by emulsifying the solution in water and evaporating off the solvent, or by adding water containing an emulsifier to a solution of the polymer until phase inversion takes place and water becomes the continuous phase, then evaporating off the solvent. The polymer solids content of the latices prepared in this manner may be adjusted by either evaporation of excess water or by addition of water for dilution.

Latices prepared by the emulsion polymerization process may where desired reach a polymer solids content of about 60% by weight. Usually, however, the latex is polymerized to a polymer solids content of about 20–40% by weight, following which concentration techniques are applied to raise the polymer solids content to 55% by weight or more. This concentration step may be performed in several ways such as removing the water by evaporation, centrifuging, or creaming, of which the evaporation technique is most widely used. The evaporation of water from the latex may be achieved by application of controlled heat and vacuum conditions to the body of the latex or to thin films of such latex. Techniques for increasing the size of the rubber particles of the latex include a controlled freezing and thawing of the latex, or passing the latex through small orifices under high pressure. The freezing and thawing technique was applied to the latices employed in the examples of the present specification. By this technique latices containing 70 or more percent polymer solids content may be obtained. When employing latices prepared by aqueous emulsion polymerization followed by subsequent agglomeration and concentration, the rubbery solids content will not normally exceed 75% by weight.

After a latex containing at least 60% rubbery polymer solids content is obtained, the unemulsified oil is added directly into the latex while maintaining sufficient agitation to obtain a uniform blend. No addition of emulsifying agent or emulsifier-forming agent is required or desired to be made to the oil or latex before blending. The elimination of the addition of emulsifier is a much to be desired feature of this invention in that it reduces the tendency to foaming in the subsequent processing of the latex-oil blend and prevents a decrease in the adhesive properties i.e. tack and bond strength of adhesives formulated therefrom. An additional feature of the present invention is that the latex is not further diluted by water as in the case where the oil is added as a prepared aqueous emulsion of oil; thus, by preventing such dilution by water, addition of greater amounts of oil is permitted.

The oil-extended, high-solids latex prepared by the process of this invention may be compounded in much the same manner as the non-oil-extended, high-solids latex of the prior art. The claimed latex may be compounded with materials such as vulcanizing agents, accelerators, activators, and fillers, and it may be vulcanized. Application is visualized particularly to the preparation of fabric and fibre adhesives, such as fabric doubling adhesives, and in nonwoven fibre batts for packing, etc. The latex may be diluted with water before compounding, but when such dilution step is preformed it is recommended that the total solids of polymer plus oil not be reduced to less than about 70% by weight.

The following examples are given by way of illustration and are not intended to limit the invention in any respect.

EXAMPLE I

An aqueous latex of a rubbery copolymer of butadiene-1,3 and styrene was prepared by aqueous emulsion polymerization of the monomers using the following recipe:

| | |
|---|---|
| Butadiene-1,3 _____parts by weight__ | 72 |
| Styrene _____do____ | 28 |
| Water _____do____ | 130 |
| Potassium oleate _____do____ | 3.5 |
| Sodium alkyl naphthalene sulfonate _____do____ | 0.1 |
| $Na_3PO_4 \cdot 12H_2O$ _____do____ | 0.4 |
| KCl _____do____ | 0.4 |
| Ethylene diamine tetra-acetic acid _____do____ | 0.02 |
| $Na_2S_2O_4 \cdot 2H_2O$ _____do____ | 0.02 |
| Tertiary dodecyl mercaptan _____do____ | 0.03 |
| Di-isopropylbenzene hydroperoxide _____do____ | 0.05 |
| $FeSO_4 \cdot 7H_2O$ _____do____ | 0.002 |
| Sodium formaldehyde sulfoxylate _____do____ | 0.009 |
| Sodium dimethyl dithiocarbamate (as shortstop) parts by weight__ | 0.1 |
| Reaction temperature _____° F__ | 45 |
| Reaction time _____hours__ | 21 |
| Percent conversion _____ | 75 |
| Percent total solids content _____ | 33.9 |

The thus prepared latex was stripped of unreacted monomers and frozen at −35° F. for one minute, then thawed to increase the average particle size of the rubbery particles in the latex. The frozen latex was then allowed to melt in a tank at 80° F. This fluid latex was then concentrated on a Rodney-Hunt Turbafilm Evaporator to a total solids content of 68.5 weight percent. (68.5 percent total solids content is equivalent to about 62 weight percent rubbery polymer solids.)

240 gallons of the concentrated latex were placed into a 300 gallon tank equipped with a marine-type agitator having 10-inch blades and capable of operating at 450 r.p.m. The agitator was started and unemulsified unadulterated Circosol N.S. extender oil was added until the oil content of the latex was 95 parts by weight of oil per 100 parts by weight of latex total solids. This is equivalent to 105 parts by weight oil per 100 parts by weight of rubbery butadiene-styrene copolymer. The oil-extended latex was fluid and stable with no oil separating out on standing even after dilution with water to 75% solids said solids being total original concentrated latex solids plus added oil.

Three 45 gallon drums of the concentrated base latex, the oil-extended latex, and the oil-extended diluted latex, respectively, were allowed to rest unagitated for 14 days. The viscosity and storage stability were determined on each latex.

| | Conc. base latex | Oil-extended latex | Oil-extended diluted latex |
|---|---|---|---|
| Total solids, weight percent_____ | 68.5 | 80.5 | 72 |
| Viscosity-poises (Brookfield No. 3 spindle at 30 r.p.m.)_____ | 13.8 | 18.6 | 3.2 |
| Storage stability, percent (difference in total solids between top and bottom of 45 gallon drum)____ | 1.0 | 0.5 | 1.5 |

These results indicate that a fluid and stable oil-extended high solids latex is obtained when 105 parts by weight of unemulsified extender oil per 100 parts by weight of rubbery polymer is blended into a concentrated aqueous latex of a rubbery polymer.

EXAMPLE II

This example serves to illustrate that dispersions of compounding materials such as organic accelerators, zinc oxide, sulfur, and fillers such as clays, whitings, or talcs can be added to the oil-extended latex to obtain a satisfactory compounded latex.

A latex similar to that of Example I, but of total solids content of 67.5% by weight was extended by 95 parts by weight of unemulsified unadulterated Circosol N.S., per 100 parts by weight of latex total solids.

To this oil-extended high solids latex, were added the following materials, the indicated parts being parts by weight per 100 parts of latex total solids plus oil:

(A) 0.64 dry parts of the surface agent Nopco 1525; [1]

(B) 0.10 dry parts of the curing accelerator ZDC,[2] as a 50% dispersion; [3]

(C) 0.51 dry parts of another curing accelerator ZMBT,[4] as a 50% dispersion; [3]

(D) 0.38 dry parts of an anti-oxidant "2246," [5] as a 50% dispersion; [3]

(E) 1.02 dry parts of sulphur, as a 55% dispersion; [3]

(F) 1.54 dry parts of zinc oxide, as a 50% dispersion,[3] and finally (G) 50 parts, as a dispersion of whiting (a compounding grade of calcium carbonate). Whiting dispersion prepared by mixing the ingredients of the following recipe:

| | Parts by wt. |
|---|---|
| Nopco 1525, dry _____ | 1.5 |
| Sodium pyrophosphate (5% by weight aqueous solution), wet _____ | 10.0 |
| Potassium hydroxide (15% by weight aqueous solution), wet _____ | 0.2 |
| Whiting, dry _____ | 100.0 |

The resulting mixture was a stable compounded latex of 77% by weight total solids content with a viscosity of 10.7 poises (Brookfield, #2 spindle at 12 r.p.m.).

Further, the aforementioned compounding of this oil-extended latex was repeated but included was sufficient water in the whiting dispersion to give 70% by weight solids in the compounded latex. This too resulted in a stable compounded latex, but of lower solids, i.e. 70% by weight, and a viscosity of 2.0 poises (Brookfield, #2 spindle at 12 r.p.m.).

---

[1] Nopco 1525 is a trademark for an alkyl phenol ethylene oxide condensate.
[2] ZDC—zinc salt of diethyldithiocarbamate.
[3] Dispersions of about 50% solids available under the trademark of "Letol" dispersions for latex compounding.
[4] ZMBT—zinc salt of mercaptobenzothiazole.
[5] Anti-oxidant "2246"—trademark for a 2,2-methylene-bis-4-methyl-6-tertiary-butyl phenol.

From Example II it can be concluded that not only can a high solids latex be extended with the high oil loading of 95 parts per 100 parts latex solids, but that this oil-extended latex will accept compounding dispersions without coagulum formation—a necessary requirement for utility of the oil extended latex.

EXAMPLE III

This example illustrates that satisfactory adhesion properties may be obtained with latices extended with large quantities of oil.

To a rubber latex of the same type as of Examples I and II, were added 95 parts of the unemulsified extender oil Circosol N.S. The following ingredients were then blended into the oil-extended latex, all indicated parts being parts by weight per 100 parts latex total solids plus oil:

(A) 1.03 dry parts of the surface active agent Nopco 1525;

(B) Amounts of other ingredients shown as follows, such being about 50% dispersions;

(C) 0.39 dry parts of an antioxidant "2246," as a 50% dispersion;

(D) 1.54 dry parts of zinc oxide, as a 50% dispersion;

(E) 0.26 dry parts of a thickener, Acrysol G.S.[6] as a 14% solution; and (F) 0.31 dry parts of sulphur, as a 60% dispersion.

Duplicate strips of pre-dried 10 ounce cotton duck, each two inches by sixteen inches, were coated with a quantity of latex compound equivalent to about 4 ounces of latex compound per square yard of fabric. The strips were doubled (each on itself), pressed together with a roller, and dried overnight at 77° F. The samples were then cured at 250° F., and allowed to rest overnight at 77° F. The strips were then trimmed to one inch width, and pulled apart by an Instron Tester at a speed of one inch per minute. The results for the adhesion strength for each of three compounds using different curing accelerators were as follows:

| Type | Accelerator (parts dry weight per 100 parts latex solids plus oils) | Cure time (min.) (at 250° F.) | Adhesion (lbs./inch pull) |
| --- | --- | --- | --- |
| ZMBT | 0.13 | 25 | 8.8 |
| ZDC plus ZMBT | 0.13+0.65 | 5 | 6.0 |
| TMTD [1] | 0.13 | 5 | 4.5 |

[1] TMTD—tetramethyl thiuram disulphide.

EXAMPLE IV

Seven samples of a latex similar to that employed in Example I were blended with 50. 70, 100, 150, 200, 500 and 1000 parts respectively of unemulsified unadulterated Circosol N.S. No separation of oil was noted after seven days standing. To determine whether or not the oil in the samples containing 100, 150, 200, 500 and 1000 parts of oil was in the dispersed phase, portions of each sample were added to water. In each case, the samples dispersed readily. The immediate absence of free oil indicated that the water was still the continuous phase. A small proportion of oil eventually (41 days) did separate out from the sample containing 1000 parts of oil. This indicates that the addition of 1000 parts of oil per 100 parts rubbery polymer is about the maximum amount of unemulsified oil which may be added.

---

[6] Acrysol G.S. is a trademark for a sodium polyacrylate.

EXAMPLE V

A polystyrene resin latex was prepared using the recipe of Example I but wherein the sole monomer was styrene. This latex was blended with a portion of unconcentrated latex of the rubbery polymer obtained in Example I in such proportion as to obtain a latex blend in which the resin to rubber ratio was 15:100. This latex blend was freeze agglomerated and concentrated, as in the method of Example I, to a latex total solids content of 63% by weight.

Into this concentrated latex blend, 105 parts of unemulsified unadulterated Circosol N.S. were blended. The resulting blend was fluid and stable even when diluted to 70% by weight polymer plus oil solids.

What is claimed is:

1. A process comprising blending from 50 to 1000 parts of an unemulsified extender oil with an aqueous emulsion polymerized latex comprising a rubbery polymer of a polymerized $C_4$–$C_6$ open chain multi-olefinic hydrocarbon, said latex containing at least 55% by weight of rubbery polymer and having a viscosity at 77° F. of at least two poises, said parts of oil being parts by weight per 100 parts by weight of said rubbery polymer, said blending being carried out while maintaining the oil and the latex free of adulteration with a material selected from the group consisting of emulsifiers and compounds capable of being converted into emulsifiers on exposure to alkaline conditions, said material being additional to the amount of emulsifier already present in the latex as a result of the preparation of said latex.

2. A process as claimed in claim 1 wherein the multi-olefinic hydrocarbon is a butadiene-1,3, the oil is blended in amount of 75–125 parts and the aqueous latex has a viscosity at 77° F. of 5–20 poises and a rubbery polymer solids content of 60–70 weight percent.

3. A process as claimed in claim 2 wherein the latex comprises a mixture of rubbery polymer with up to 20 parts of a resinous polymer selected from the group consisting of polystyrene and copolymers of a butadiene-1,3 and styrene containing more than 70% copolymerized styrene, said parts of resinous polymer being parts by weight per 100 parts of rubbery polymer plus resinous polymer.

4. A process as claimed in claim 3 wherein said rubbery polymer is a copolymer of butadiene-1,3 and styrene in which the copolymerized styrene content forms between 0% and 60% by weight of the copolymer.

5. A composition prepared by the process as claimed in claim 1.

6. A composition prepared by the process as claimed in claim 4.

References Cited

UNITED STATES PATENTS

| | | | |
| --- | --- | --- | --- |
| 3,080,334 | 3/1963 | Kolaczewski et al. | 260—2.5 |
| 3,284,396 | 11/1966 | Talalay. | |
| 2,680,140 | 6/1954 | Carter | 260—29.7 |

FOREIGN PATENTS

| | | |
| --- | --- | --- |
| 141,295 | 4/1961 | U.S.S.R. |

SAMUEL H. BLECH, *Primary Examiner.*

JOHN T. GOOLKASIAN, *Assistant Examiner.*

U.S. Cl. X.R.

260—33.6